US008405268B2

(12) United States Patent
Bailey et al.

(10) Patent No.: US 8,405,268 B2
(45) Date of Patent: Mar. 26, 2013

(54) STATOR WITH MONOLITHIC MOUNTING BOSSES AND ASSEMBLY COMPRISING THE SAME

(75) Inventors: Daniel E. Bailey, Ballwin, MO (US); Daniel E. Hilton, St. Louis, MO (US); Gary E. Horst, Manchester, MO (US)

(73) Assignee: Nidec Motor Corporation, St. Louis, MO (US)

( * ) Notice: Subject to any disclaimer, the term of this patent is extended or adjusted under 35 U.S.C. 154(b) by 361 days.

(21) Appl. No.: 12/708,315

(22) Filed: Feb. 18, 2010

(65) Prior Publication Data

US 2011/0198956 A1    Aug. 18, 2011

(51) Int. Cl.
*H02K 1/04* (2006.01)
*H02K 5/00* (2006.01)

(52) U.S. Cl. ............... 310/91; 310/43; 310/71
(58) Field of Classification Search ............ 310/43, 310/71, 91; 29/596; *H02K 1/04, 5/00*
See application file for complete search history.

(56) References Cited

U.S. PATENT DOCUMENTS

| | | |
|---|---|---|
| 5,040,285 A | 8/1991 | Williams et al. |
| 5,266,855 A | 11/1993 | Smith et al. |
| 5,353,613 A | 10/1994 | Smith et al. |
| 5,497,040 A | 3/1996 | Sato |
| 5,521,779 A | 5/1996 | Arakawa et al. |
| 5,737,944 A | 4/1998 | Nishimura et al. |
| 5,778,703 A | 7/1998 | Imai et al. |
| 5,809,809 A | 9/1998 | Neumann |
| 5,831,366 A | 11/1998 | Kern et al. |
| 5,862,686 A | 1/1999 | Skrippek |
| 5,894,746 A | 4/1999 | Skrippek |
| 5,969,455 A * | 10/1999 | Sakamoto ............ 310/194 |
| 5,996,379 A | 12/1999 | Skrippek |
| 6,050,113 A | 4/2000 | Skrippek et al. |
| 6,093,984 A | 7/2000 | Shiga et al. |
| 6,131,422 A | 10/2000 | Skrippek et al. |
| 6,148,647 A | 11/2000 | Kabeya et al. |
| 6,166,474 A * | 12/2000 | Kohara et al. ........ 310/216.093 |
| 6,333,576 B1 * | 12/2001 | Ishikawa et al. ............ 310/85 |
| 6,341,507 B1 | 1/2002 | Rode et al. |
| 6,370,761 B2 | 4/2002 | Shiga et al. |
| 6,396,190 B1 | 5/2002 | Ahn et al. |
| 6,460,382 B1 | 10/2002 | Kim et al. |
| 6,474,114 B1 | 11/2002 | Ito et al. |
| 6,510,716 B1 | 1/2003 | Kim et al. |
| 6,914,363 B2 | 7/2005 | Kim et al. |
| 6,993,822 B2 | 2/2006 | Park et al. |
| 7,131,178 B2 | 11/2006 | Kim et al. |

(Continued)

FOREIGN PATENT DOCUMENTS

DE    102007030508 A1    1/2009
EP        1541738 A2    6/2005

(Continued)

*Primary Examiner* — John K Kim
(74) *Attorney, Agent, or Firm* — Thompson Coburn LLP; Clyde L. Smith

(57) ABSTRACT

A stator comprises a ferromagnetic core having teeth. The stator also comprises first and second insulator members. The first and second insulating members collectively encircle each of the teeth of the core. The first insulating member comprising a plurality of mounting bosses spaced circumferentially from each other about the axis. Each of the mounting bosses has first and second retaining surfaces. The first and second retaining surfaces face axially opposite directions from each other and are exposed and are unobstructed by the second insulating member.

15 Claims, 5 Drawing Sheets

U.S. PATENT DOCUMENTS

| | | |
|---|---|---|
| 7,132,771 B2 | 11/2006 | Kwon et al. |
| RE39,416 E | 12/2006 | Shin et al. |
| 7,166,950 B2 | 1/2007 | Kim et al. |
| 7,262,526 B2 | 8/2007 | Shiga et al. |
| 7,262,540 B2 | 8/2007 | Lee |
| 7,271,512 B2 * | 9/2007 | Lee et al. .................. 310/43 |
| 7,271,519 B2 | 9/2007 | Lee |
| 7,294,942 B2 | 11/2007 | Lee et al. |
| 7,305,857 B2 | 12/2007 | Kim et al. |
| 7,317,272 B2 | 1/2008 | Shiga |
| 7,336,014 B2 | 2/2008 | Lee |
| 7,342,344 B2 | 3/2008 | Lee |
| 7,362,028 B2 | 4/2008 | Lee |
| 7,520,148 B2 * | 4/2009 | Choi ........................ 68/140 |
| 2003/0146671 A1 * | 8/2003 | Diehl et al. ............... 310/254 |
| 2004/0232789 A1 * | 11/2004 | Lim et al. .................. 310/91 |
| 2005/0127775 A1 * | 6/2005 | Lee et al. .................. 310/216 |
| 2006/0059957 A1 | 3/2006 | Kim |
| 2008/0024031 A1 | 1/2008 | Lee |
| 2008/0036327 A1 | 2/2008 | Hattori et al. |
| 2008/0042510 A1 | 2/2008 | Park |
| 2008/0067879 A1 | 3/2008 | Kim et al. |
| 2008/0122305 A1 | 5/2008 | Kim |
| 2008/0129131 A1 | 6/2008 | Shin et al. |
| 2008/0136287 A1 | 6/2008 | Lee |
| 2010/0148597 A1 * | 6/2010 | Zhang ........................ 310/43 |
| 2011/0193433 A1 * | 8/2011 | Bohrer et al. ............. 310/71 |
| 2011/0198956 A1 * | 8/2011 | Bailey et al. ............. 310/91 |

FOREIGN PATENT DOCUMENTS

| | | |
|---|---|---|
| JP | 11289695 A | 10/1999 |
| JP | 2000050555 A | 2/2000 |
| WO | 2006/075903 A2 | 7/2006 |

* cited by examiner

STATOR WITH MONOLITHIC MOUNTING BOSSES AND ASSEMBLY COMPRISING THE SAME

CROSS-REFERENCE TO RELATED APPLICATIONS

Not Applicable

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains generally to electric motors and generators for use in appliances. More specifically, this invention pertains stators wherein the bosses that secure the stator to an appliance component are formed entirely by a single monolithic insulating member. This eases manufacturing tolerance requirements.

2. General Background

Many appliances, such as laundry machines, utilize electric motors. In some cases, direct drive motors are utilized. In a direct drive system, the stator and the rotor of the motor are mounted directly to separate components of the appliance, rather than being connected directly to each other in a motor housing. Thus, the appliance components are rotationally mounted directly to each other and this indirectly rotationally mounts the stator and the rotor to each other.

Typically, the stator forms a ring and comprises several primary components. These components include a ring-shaped ferromagnetic core having a plurality of radially extending teeth, windings that encircle the teeth, and insulating members that electrically separate the windings from the core. The insulating members are often two monolithic injection molded plastic parts that are often referred to as end caps. Each of such insulating members is formed generally as a ring having teeth corresponding to the teeth of the core and is configured to wrap halfway around each tooth of the core. Thus, when the core is sandwiched between the two insulating members, each tooth of the core is encircled by the insulating material. The windings are then formed around the insulating material that surrounds each tooth.

In practice, it is known to form bosses on the insulating members for the purpose of creating a means for attaching the stator to an appliance component. Typically, each of the insulating members comprises a plurality of protrusion that line up with the protrusion of the other insulating member. Each aligned pair of protrusions forms a boss and each boss comprises a through-hole. The bosses thereby serve as a means for securing the stator to an appliance component via bolts. To prevent damage to the stator from over torquing the bolts, metal sleeves are typically inserted into the through-holes to provide a positive stop for the bolts. As can be appreciated, the length of such sleeves must be configured such that the insulating members are not over clamped but are at least sufficiently clamped to inhibit relative movement when they are bolted to an appliance component. However, because the two insulating members collectively form each boss, tight tolerances are required to prevent the compounded total tolerances from become too large. Thus, in practice, the dimensions of the insulating members are closely controlled, which adds to the costs of producing the stators.

SUMMARY OF THE INVENTION

The present invention eliminates the problem of compounding tolerances discussed above. In one aspect of the invention, a stator comprises a core formed of ferromagnetic material. The core has a plurality of teeth arranged circumferentially about an axis. The stator also comprises first and second insulator members. Each of the first and second insulating members comprises a plurality of teeth arranged circumferentially about the axis. The teeth of the first and second insulating members collectively encircle each of the teeth of the core. The first insulating member comprises a plurality of mounting bosses spaced circumferentially from each other about the axis The core of the stator is configured and adapted to be held secure to an appliance component solely via the mounting bosses of the first insulating member.

In another aspect of the invention, a stator comprises a core and first and second insulating members. The core is formed of ferromagnetic material and has a plurality of teeth arranged circumferentially about an axis. Each of the first and second insulating members comprises a plurality of teeth arranged circumferentially about the axis. The teeth of the first and second insulating members collectively encircling each of the teeth of the core. The first insulating member comprises a plurality of mounting bosses spaced circumferentially from each other about the axis. Each of the mounting bosses has opposite facing first and second retaining surfaces that are exposed and are unobstructed by the second insulating member.

In yet another aspect of the invention, a stator comprises a core and first and second insulating members. The core is formed of ferromagnetic material and has a plurality of teeth arranged circumferentially about an axis. Each of the first and second insulating members comprises a plurality of teeth arranged circumferentially about the axis. The teeth of the first and second insulating members collectively encircling each of the teeth of the core. The first insulating member comprising a plurality of mounting bosses spaced circumferentially from each other about the axis. The second insulating member comprises a plurality of openings spaced circumferentially from each other about the axis. Each of the openings extending axially through the second insulating member. Each respective one of the mounting bosses extends at least partially through a respective one of the openings of the second insulating member. The mounting bosses and the openings having interlocking geometry that radially and circumferentially secures the first and second insulating members to each other relative to the axis.

Further features and advantages of the present invention, as well as the operation of the invention, are described in detail below with reference to the accompanying drawings.

Figure 1:
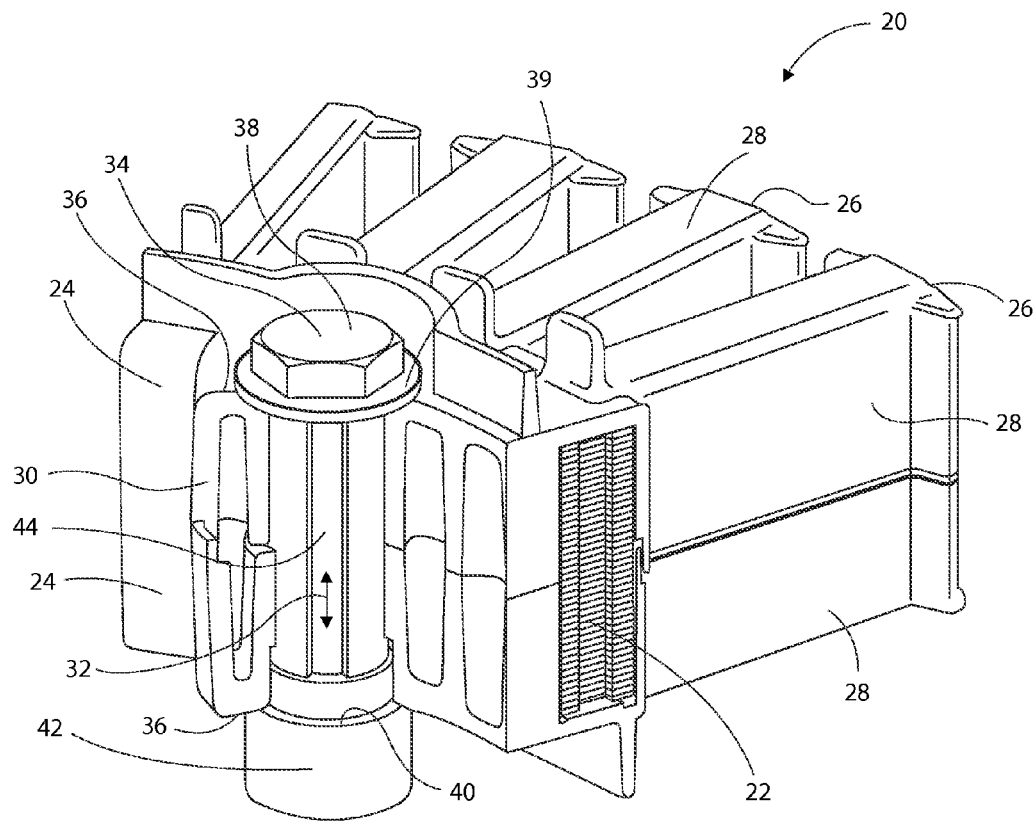
FIG. 1 is a perspective view of a sectioned portion of a prior art stator configuration showing a boss made up of two insulating members.

Reference numerals in the written specification and in the drawing figures indicate corresponding items.

DETAILED DESCRIPTION

A portion of a prior art stator 20 is shown in FIG. 1 and comprises a stator core 22 encased in two insulating members 24. The core 22 is formed of ferromagnetic material and is ring-shaped with a plurality of teeth 26 that extend radially outward from a central axis. Likewise, the insulating members 24 are both ring-shaped and have a plurality of teeth 28 that extend radially outward. The core 22 is sandwiched between the two insulating members 24 in a manner such that the insulating members encapsulate and electrically shield the core 20, leaving only the radially outermost faces of the teeth 26 of the core exposed. It should be appreciated that electrically conductive wire (not shown) is ultimately wound around each of the encapsulated teeth 26 of the core 22 to thereby induce magnetic fields in the core.

Figure 2:
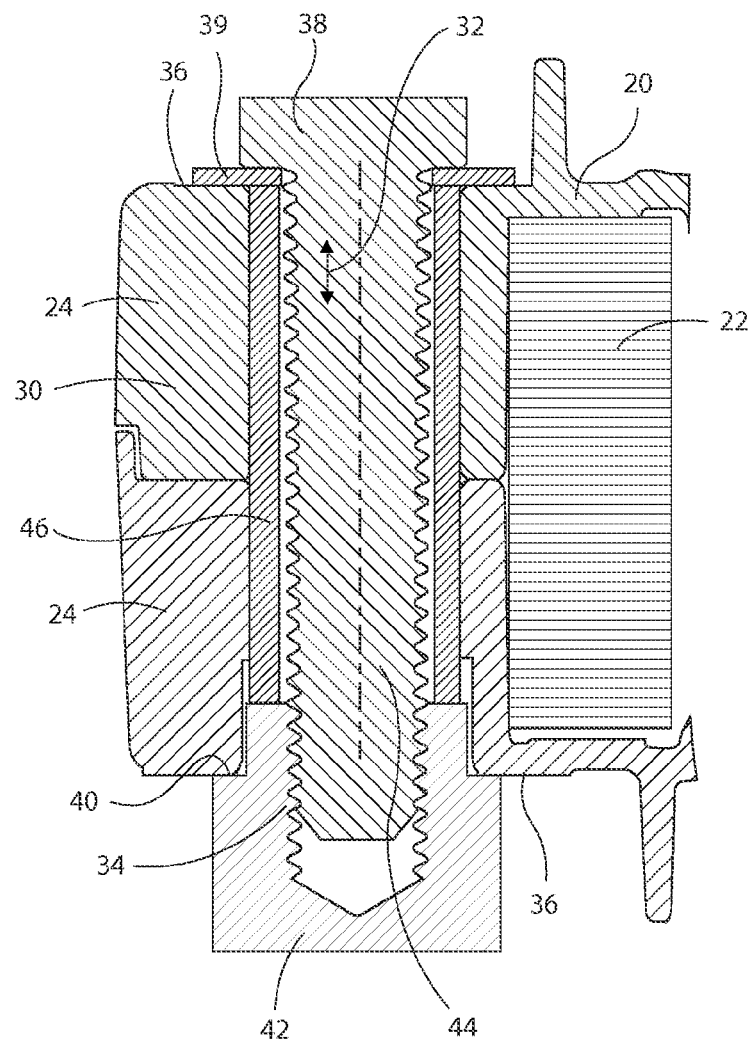
FIG. 2 is cross-section of the prior art boss shown in FIG. 1

The two insulating members 24 of the prior art stator 20 also collectively form a plurality of bosses 30 that provide means for mounting the stator to an appliance component. Although shown as being circumferentially equidistant from each other, it should be appreciated that the bosses 30 may be unevenly spaced from each other about the axis. Each of the bosses 30 comprises a through-hole 32. A bolt 34 passes through each through-hole 32 and secures the stator to an appliance component. As shown in FIG. 2, each boss 30 is formed by the two insulating members 24 and comprises opposite facing retaining surfaces 36, one being on one of the insulating members and the other being on the other insulating member. The head 38 of the respective bolt 34, together with a washer 39, engages against one of the retaining surfaces 36. The other retaining surface 36 engages against a mating mounting surface 40 on a mounting portion 42 of the appliance component. The shank 44 of the bolt 34 is threaded into the mounting portion 42 of the appliance component. Thus, the bolt 34 clamps the insulating members 28 to each other and to the mounting portion 42 of the appliance component. To prevent potential damage to the stator 20 caused by over-torquing the bolts 34, a tubular metal sleeve 46 is positioned in the through-hole 32 of each boss 30 around the shank 44 of the respective bolt 34 to provide a positive stop for torquing the bolt. As should be appreciated, the tolerance of each of the insulating members 24 is critical to ensure that the stator 20 isn't over or under clamped to the appliance component. Such tight tolerances are difficult to control and add to the costs of such prior art stators 20.

Figure 3:
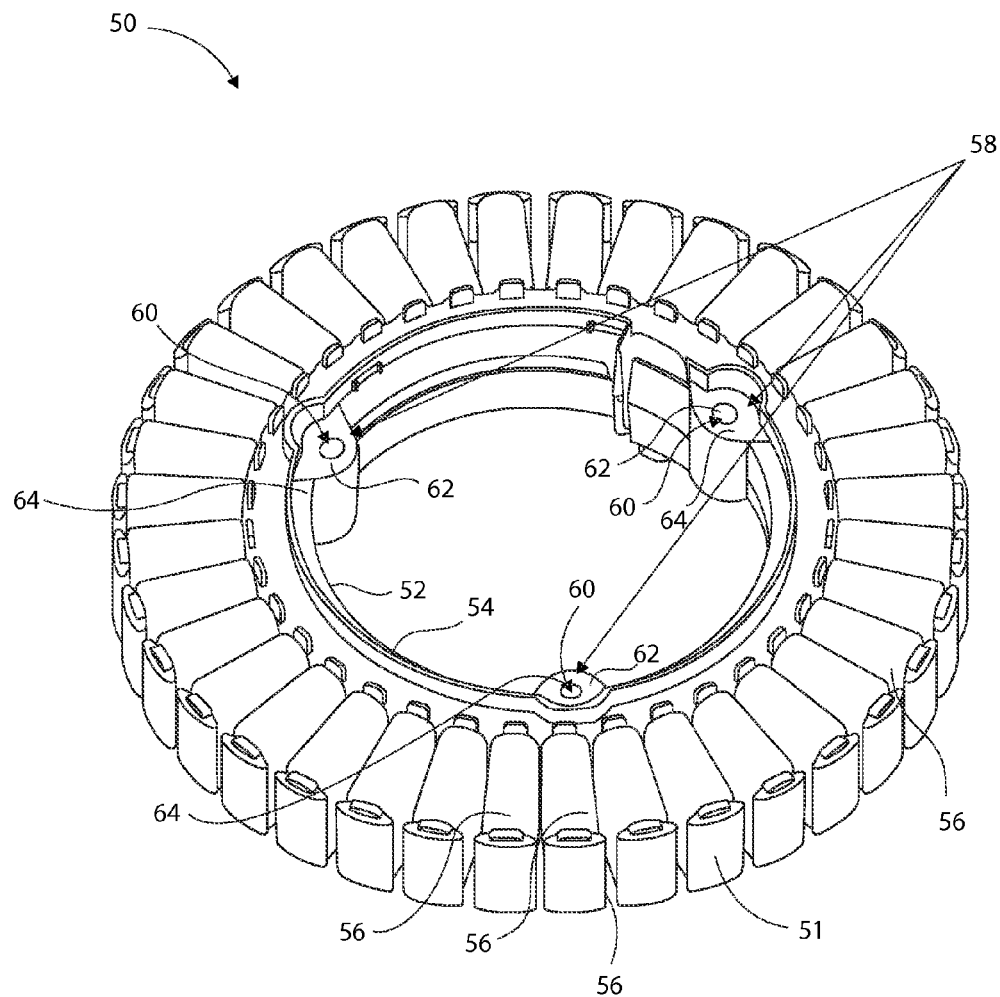
FIG. 3 is an exploded perspective view of the insulating members of the preferred embodiment of a stator in accordance with the invention.
Figure 4:
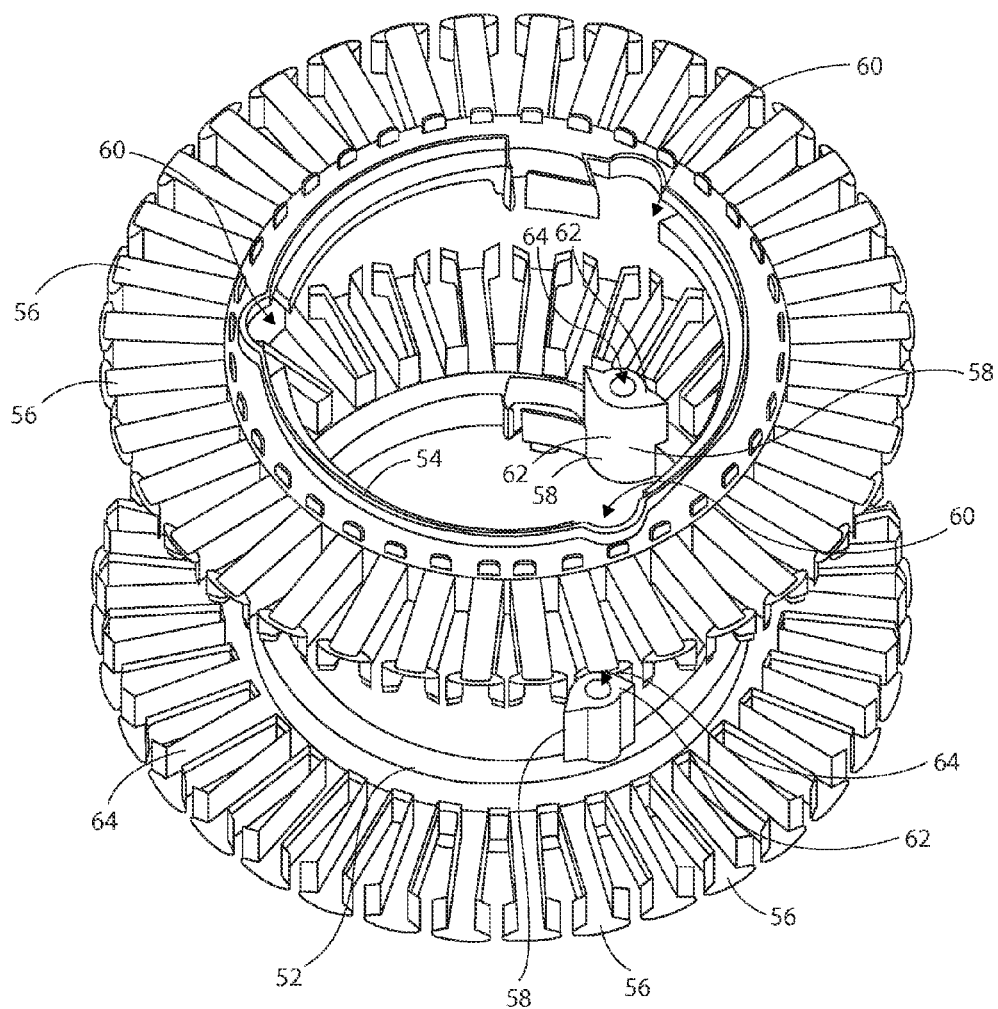
FIG. 4 is a perspective view of the insulating members of the preferred embodiment of the invention assembled together and shows their interlocking features.
Figure 5:
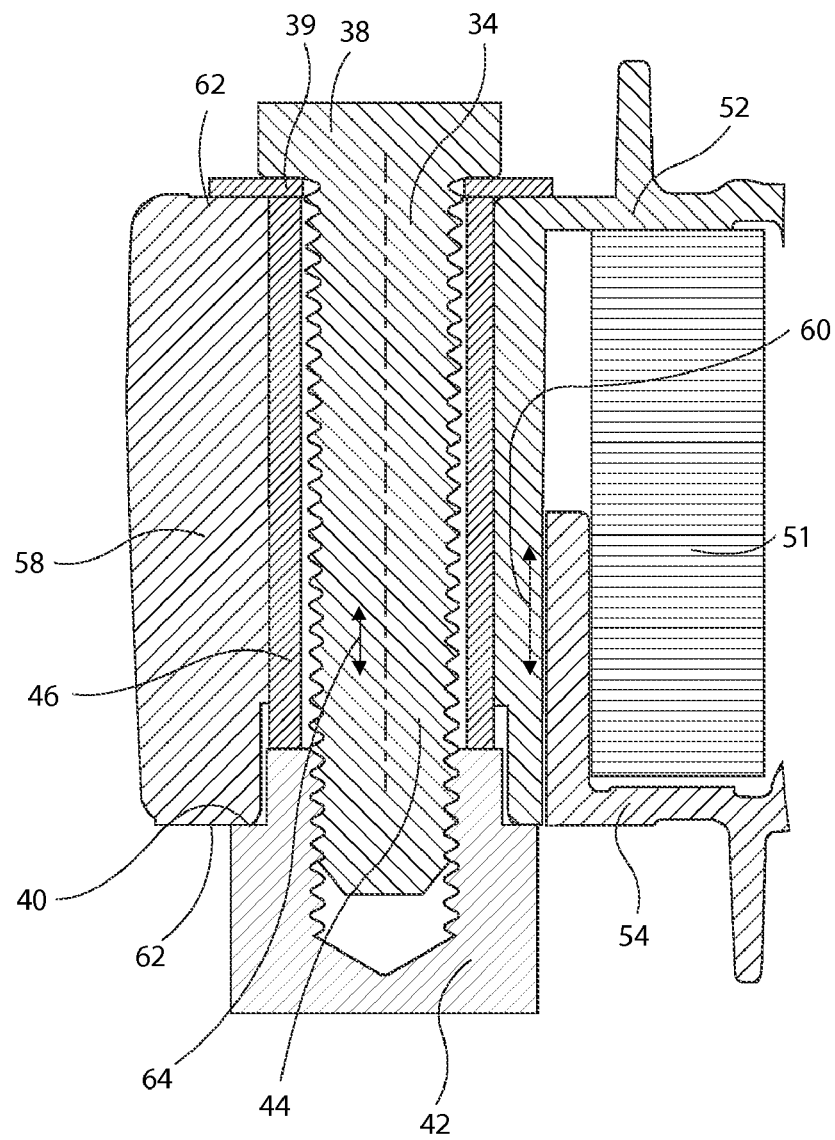
FIG. 5 is a cross-section of one of the bosses of the preferred embodiment of the invention.

The preferred embodiment of a stator 50 in accordance with the invention is shown in FIGS. 3-5. Like the prior art stators, the new stator 50 comprises a stator core 51 encased in first and second insulating members 52, 54 and the insulating members are both ring shaped with a plurality of teeth 56 that extend radially outward. The new stator 50 also comprises a plurality of bosses 58 configured for use in attaching the stator to an appliance component. However, unlike the prior art stator 20 described above, the bosses 58 of the new stator 50 are formed entirely by the first insulating member 52. The bosses 58 protrude axially from the first insulating member 52. The second insulating member 54 comprises a plurality of keyways or openings 60 that extend axially through the second insulating member and that are aligned with the bosses 58 of the first insulating member 52. When the first and second insulating members 52, 54 are assembled to each other, portions of the bosses 58 of the first insulating member are positioned within the openings 60 of the second insulating member. The bosses 58 and openings 60 have corresponding configurations that fit snugly with each other and that create interlocking geometry that resists radial and circumferential movement between the insulating members 52, 54. Similarly, the teeth 56 of the first and second insulating members 52, 54 are also configured to interlock with each other in a manner that resists radial and circumferential movement between the insulating members The bosses 58 of the first insulating member 52 form opposite retaining surfaces 62 that remain unobstructed by the second insulating member 54. A through-hole 64 extends axially through each boss 58.

The new stator 50 is preferably attached to a mounting portion 42 of an appliance via bolts 34 in a manner similar to the prior art stator 20. As shown in FIG. 5, a bolt extends through the through-hole 64 of each boss and is threadably attached to the mounting portion 42 of the appliance. The head 38 of the bolt 34 biases a washer 39 against one of the retaining surfaces 62 of the boss 58, which biases the other retaining surface of the boss against the mounting surface 40 of the mounting portion 42 of the appliance. A tubular metal sleeve 46 can be positioned in the through-hole 64 of each boss 58 around the shank 44 of the respective bolt 34 to provide a positive stop for torquing the bolt. It should be appreciated that the degree to which the new stator 50 is clamped is independent of the tolerances of the second insulating member 54. Thus, the clamping force can be controlled more easily and the insulating members 52, 54 can be made with less precision. This improves the fixation of the assembly and also reduces the production costs of the stator 50. It should also be appreciated that the second insulating member 54 remains attached to the stator 50 via the windings (not shown) that are wound around the teeth 56 of the insulating members 52, 54. Thus, the first insulating member 52 can be fixed in position between the second insulating member 54 and the mounting portion 42 of the appliance, or vice versa.

In view of the foregoing, it should be appreciated that the invention achieves the several advantages over prior art stators.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A stator comprising:
a core, the core being formed of ferromagnetic material and having a plurality of teeth arranged circumferentially about an axis; and
first and second insulating members, each of the first and second insulating members comprising a plurality of teeth arranged circumferentially about the axis, the teeth of the first and second insulating members collectively encircling each of the teeth of the core, the first insulating member comprising a plurality of mounting bosses spaced circumferentially from each other about the axis, each of the mounting bosses having opposite facing first and second retaining surfaces, the second insulating member extending axially between the first and second retaining surfaces, the first and second retaining surfaces of each of the mounting bosses being axially unobstructed by the second insulating member;
the stator being configured and adapted to be held secure to an appliance component solely via the mounting bosses of the first insulating member.

2. A stator in accordance with claim 1 wherein the second insulating member comprises a plurality of openings spaced circumferentially from each other about the axis, each of the openings extending axially through the second insulating member, each respective one of the mounting bosses of the first insulating member extends at least partially through a respective one of the openings of the second insulating member, the mounting bosses and the openings having interlocking geometry that radially and circumferentially secures the first and second insulating members to each other relative to the axis.

3. A stator in accordance with claim 1 wherein each of the mounting bosses of the first insulating member comprises a through-hole.

4. A stator in accordance with claim 1 wherein the mounting bosses of the first insulating member are positioned radially inward of the teeth of the core of the stator relative to the axis.

5. A stator comprising:
a core formed of ferromagnetic material, the core having a plurality of teeth arranged circumferentially about an axis; and
first and second insulator members, each of the first and second insulating members comprising a plurality of teeth arranged circumferentially about the axis, the teeth of the first and second insulating members collectively encircling each of the teeth of the core, the first insulating member comprising a plurality of mounting bosses spaced circumferentially from each other about the axis, each of the mounting bosses having opposite facing first and second retaining surfaces that are axially unobstructed by the second insulating member, the second insulating member extending axially between the first and second retaining surfaces.

6. A stator in accordance with claim 5 wherein the second insulating member comprises a plurality of openings spaced circumferentially from each other about the axis, each of the openings extends axially through the second insulating member, each respective one of the mounting bosses extends at least partially through a respective one of the openings of the second insulating member, and the mounting bosses and the openings have interlocking geometry that radially and circumferentially secures the first and second insulating members to each other relative to the axis.

7. A stator in accordance with claim 5 wherein each of the mounting bosses of the first insulating member comprises a through-hole, and wherein the stator further comprising a plurality of tubular sleeves, each respective one of the sleeves being positioned in the through-hole of a respective one of the bosses.

8. An assembly comprising:
a stator in accordance with claim 5; and
an appliance component, the stator being held secure to the appliance component solely via the mounting bosses of the first insulating member.

9. An assembly in accordance with claim 8 wherein each of the mounting bosses of the first insulating member comprises a through-hole, the assembly further comprises a plurality of bolts, and each bolt passes through a respective one of the through-holes in a manner that secures the stator to the appliance component.

10. An assembly in accordance with claim 9 wherein the assembly further comprising a plurality of tubular sleeves, each respective one of the sleeves being positioned in the through-hole of a respective one of the bosses.

11. A stator in accordance with claim 5 wherein the mounting bosses of the first insulating member are positioned radially inward of the teeth of the core of the stator relative to the axis.

12. A stator comprising:
a core formed of ferromagnetic material, the core having a plurality of teeth arranged circumferentially about an axis; and
first and second insulator members, each of the first and second insulating members comprising a plurality of teeth arranged circumferentially about the axis, the teeth of the first and second insulating members collectively encircling each of the teeth of the core, the first insulating member comprising a plurality of mounting bosses spaced circumferentially from each other about the axis, the second insulating member comprises a plurality of openings spaced circumferentially from each other about the axis, each of the openings extending axially through the second insulating member, each respective one of the mounting bosses extends at least partially through a respective one of the openings of the second insulating member, the mounting bosses and the openings having interlocking geometry that radially and circumferentially secures the first and second insulating members to each other relative to the axis, each of the mounting bosses having opposite facing first and second retaining surfaces that are axially unobstructed by the second insulating member.

13. An assembly comprising:
a stator in accordance with claim 12, and
an appliance component, the stator being held secure to the appliance component solely via the mounting bosses of the first insulating member.

14. An assembly comprising:
a stator in accordance with claim 12; and
an appliance component, the appliance component being secured to the stator with the second insulating member being positioned between the first insulating member and the appliance component.

15. An assembly in accordance with claim 14 wherein each of the mounting bosses of the first insulating member comprises a through-hole, the assembly further comprises a plurality of bolts, and each bolt passes through a respective one of the through-holes.

* * * * *